United States Patent [19]
Gak et al.

[11] Patent Number: 6,141,225
[45] Date of Patent: Oct. 31, 2000

[54] AUTO-SYNCHRONIZED DC/DC CONVERTER AND METHOD OF OPERATING SAME

[75] Inventors: Michel Gak, La Louvière; Giorgio Trusgnach, Binche, both of Belgium

[73] Assignee: Alcatel, Paris, France

[21] Appl. No.: 09/270,511

[22] Filed: Mar. 17, 1999

[30] Foreign Application Priority Data

Mar. 19, 1998 [EP] European Pat. Off. ............ 98400651

[51] Int. Cl.[7] .................................................. H02M 3/335
[52] U.S. Cl. ............................................. 363/25; 363/134
[58] Field of Search .................................. 363/24, 25, 62, 363/95, 97, 131, 133, 139, 134

[56] References Cited

U.S. PATENT DOCUMENTS 4,656,570   4/1987   Swoboda .
4,953,068   8/1990   Henze ........................................ 363/17
5,138,249   8/1992   Capel ....................................... 323/283
5,381,327   1/1995   Yan ........................................... 363/24
5,430,641   7/1995   Kates ....................................... 363/133
5,844,378   12/1998   LoCascio et al. ...................... 315/307
5,994,885   11/1999   Wilcox et al. .......................... 323/285

FOREIGN PATENT DOCUMENTS 0 613 233 A1   8/1994   European Pat. Off. .

*Primary Examiner*—Adolf Deneke Berhane
*Attorney, Agent, or Firm*—Sughrue, Mion, Zinn, Macpeak & Seas, PLLC

[57] ABSTRACT

A DC/DC converter comprising a buck stage that includes a buck switch, a push-pull stage that includes push-pull switches, and a controller to control the switching phases of the buck and push-pull switches. The turn-on phases of these buck and push-pull switches are automatically and continuously adjusted to an optimal value at each occurrence of a synchronization pulse produced at a fixed frequency by an autosynchronization circuit.

7 Claims, 2 Drawing Sheets

AUTO-SYNCHRONIZED DC/DC CONVERTER AND METHOD OF OPERATING SAME

BACKGROUND OF THE INVENTION

The present invention relates to a DC/DC converter adapted to convert an unstable DC input voltage into a high DC output voltage.

A conventional DC/DC converter comprises as input stage, a first switching circuit operating as a current source and, as output stage, a second switching circuit operating to increase the voltage. In order to increase the yield while decreasing the weight of the apparatus for use in space applications, it has been proposed to use the second switching circuit in a resonant mode.

In such a DC/DC converter, the signals at the output of the first and second switching circuits are generally in phase. It results therefrom that this known DC/DC converter does almost not permit to regulate the output voltage when the fluctuations of the input voltage are too high: the converter circuitry becomes unstable, the resonance is bad and the shape of the sinusoidal wave is destroyed.

SUMMARY OF THE INVENTION

Accordingly, it is an object of the present invention to provide a DC/DC converter which ensures good voltage regulation even in case of unstable input voltage having high fluctuations.

The basic idea behind the present invention is that the optimal regulation is not constant but is dependent on the input voltage value and that the optimal regulation is obtained for a phase shift of about 180 degrees between the output voltage of the input stage and the output voltage of the output stage.

In order to achieve this object the invention provides a DC/DC converter and a method of synchronizing same as defined in the appended claims.

A DC/DC converter according to this invention comprises a buck stage that includes a buck switch, a push-pull stage that includes push-pull switches, a controller to control the switching phases of the buck and push-pull switches, and an autosynchronizing circuit adapted to produce synchronization pulses at a fixed frequency and to automatically and continuously adjust the turn-on phases of the buck and push-pull switches to an optimal value at each occurrence of a synchronization pulse.

With the converter according to this invention and operating as set-forth herein later, the optimal value for the relative phase shift is automatically obtained at the start-up of the converter and is then continuously adjusted during the operation thereof. A high output voltage (several thousands of volts) can be obtained and can be maintained constant even for relatively high fluctuations of the input DC voltage, e.g. fluctuations of between 30 and 50 volts.

BRIEF DESCRIPTION OF THE DRAWING

The object and features of the present invention will be more readily apparent from the description hereafter, taken in conjunction with the accompanying drawings, in which.

DETAILED DESCRIPTION OF THE INVENTION

Figure 1:
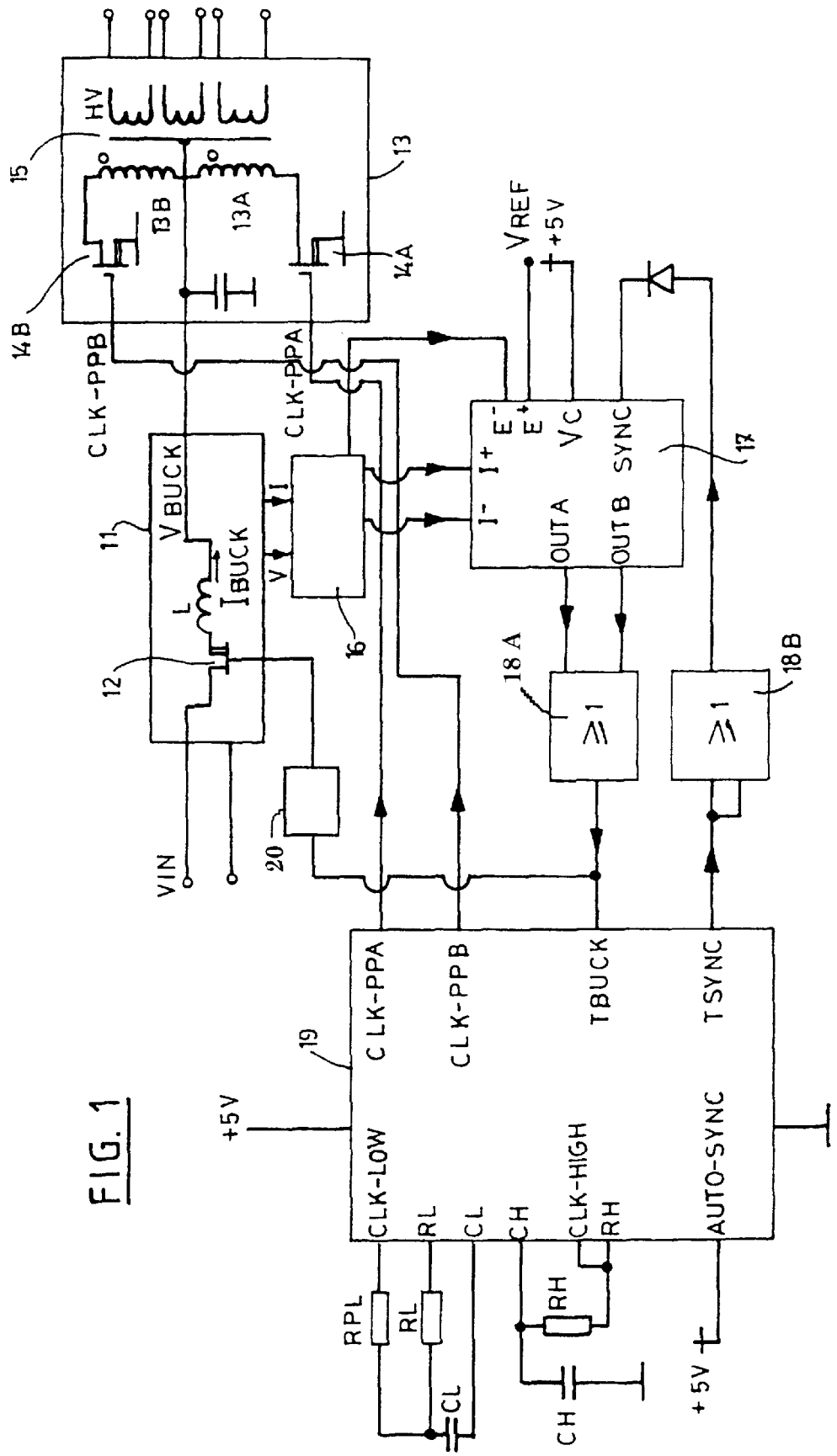
FIG. 1 is a block diagram of an exemplary embodiment of a DC/DC converter according to the invention.

Referring to the drawings, more particularly to FIG. 1, there is shown a diagram of a quasi-resonant DC/DC converter incorporating the invention. The input stage is a buck circuit 11, the input terminals of which accept the input bus voltage $V_{IN}$. The buck circuit is a topology providing an output voltage $V_{BUCK}$ that is always lower or equal to the input voltage. In this application, the buck circuit operates in a continuous mode (i.e. the inductance current never falls to zero) and switches at a fixed frequency controlled by drive pulses $T_{BUCK}$ applied to the buck switch 12.

The output stage of the DC/DC converter is a resonant push-pull circuit 13 having two legs 13A and 13B including switches 14A and 14B respectively, that are caused to switch at a fixed frequency to drive a high voltage transformer 15.

The drive pulses $T_{BUCK}$ are produced by a PWM controller 17, the purpose of which is to regulate the buck output voltage $V_{BUCK}$ for a given bus input voltage range. The controller may be for instance a UC 1846 J circuit manufactured by UNITRODE™ at 7, Continental Blvd, Merrimack, N.H. 03054-USA). The regulation is based on the signals from two regulation loops embodied in feedback network 16 adapted to provide signals representative of both the buck output voltage $V_{BUCK}$ and the buck inductance current $I_{BUCK}$. The buck output voltage $V_{BUCK}$ is compared to a reference value $V_{REF}$ and the output current $I_{BUCK}$ is used to control the output voltage in order to allow same to reach the correct value. The controller 17 is adapted to control the duration of the drive pulses $T_{BUCK}$ so that the output voltage $V_{BUCK}$ reaches the correct value. When the controller 17 has reached its regulation point, the drive pulse $T_{BUCK}$ is turned off, whereby the energy transfer to the push-pull stage 13 is temporarily stopped until the next switching period.

Figure 2:
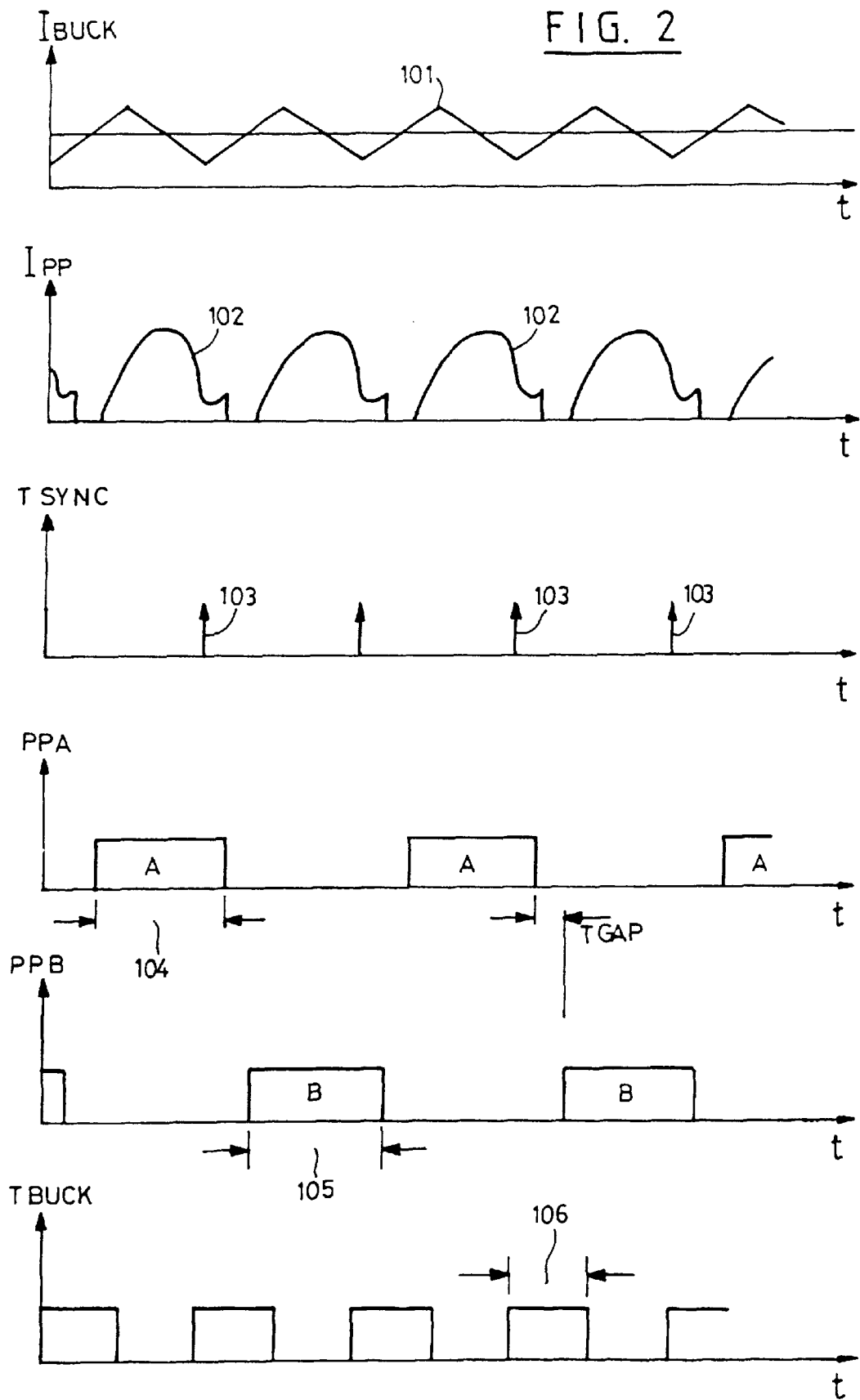
FIG. 2 are time diagrams illustrating the operation of the DC/DC converter of this invention.

At each switching period, the controller internal logic toggles under the control of a synchronization pulse $T_{SYNC}$ in order to deliver the drive pulse $T_{BUCK}$ to its output A or its output B, which drive pulse $T_{BUCK}$ is sent to the buck switch 12 through a digital OR-gate 18A, for instance a 54 AC 32 circuit, in series with an opto-coupler 20, that is for instance a HCPL 5601 circuit. The circuit 54 AC 32 is manufactured by NATIONAL SEMICONDUCTOR™ at 2900 Semiconductor Drive, Santa Clara, Calif. 95052-8090-USA, whilst the circuit HCPL 5601 is manufactured by the HEWLETT PACKARD™ COMPANY at 370, West Trimble Road, San Jose, Calif. 95131-USA. The synchronization pulses are produced at a fixed frequency by an autosynchronization circuit 19, the operation of which is set forth herein after with further reference to the time diagrams in FIG. 2. In these diagrams, waveform 101 represents the inductance current in the buck stage, waveforms 102 represent the current in the push-pull stage, the arrows 103 represent the synchronization pulse occurrences, time span 104 represents the turn-on phase of the switch in leg A of the push-pull stage, time span 105 represents the turn-on phase of the switch in push-pull leg B, and time span 106 represents the turn-on phase of the drive pulse $T_{BUCK}$ for the buck switch.

The autosynchronization circuit is for instance a package of the type SMC 610 A, that is an ASIC based on the CMOS 1 μm technology, manufactured by MATRA™ MHS S.A. at La Chantrerie-Rue de Gachet, BP 70602, F-44306 Nantes Cedex 03, France. The purpose of the autosynchronization circuit in this invention is to cause each gap time $T_{GAP}$ between the turn-on phases Ai and Bi of the push-pull legs to be centered on the middle of each drive pulse $T_{BUCK}$, thereby to make the regulation capability of the converter independent from the fluctuations of the input voltage $V_{IN}$.

To that effect, the autosynchronization circuit 19 controls the turn-on phase of the push-pull switches 14A and 14B from the buck phase and from the width of the drive pulses $T_{BUCK}$. At the time when $T_{BUCK}$ is turned on, the autosynchronization circuit 19 starts the width pulse measurement of the pulse $T_{BUCK}$. The period of the synchronization pulse $T_{SYNC}$ is determined by an oscillator related to the values of RL and CL (clock-low). The pulse width measurement depends on a high frequency oscillator related to RH and CH (Clock-High). The time during which $T_{BUCK}$ is ON is measured using an internal digital counter. Two microseconds or so after the starting point of $T_{SYNC}$, the drive pulse $T_{BUCK}$ is sampled. If it is a low logical level, $T_{BUCK}$ is declared to be OFF. If it is a high logical level, the internal counter starts to count the number N of clock high periods till it falls to a low logical level. The width of $T_{BUCK}$ is measured once for two periods of the buck switching frequency, i.e. two periods of the synchronization pulse $T_{SYNC}$.

When the autosynchronization circuit 19 detects the end of the pulse $T_{BUCK}$, it terminates its internal pulse width counting. The value of the counter divided by 2 (one shift to the right) is added to the turn-on phase of the synchronization pulse $T_{SYNC}$ during two periods in order to give the turn-on points of the push-pull switches 14A and 14B, that is the starting points of the command signals CLK-PPA and CLK-PPB for the push-pull legs A and B respectively.

At the start-up of the converter, the autosynchronization circuit 19 automatically and continuously determines the middle point of the drive pulse $T_{BUCK}$ and continuously adjusts the relative phase shift to the optimal value for the effective value of the input voltage.

It should be apparent to those skilled in the art that the specific embodiment shown in the drawing is by way of illustration only and that various changes and modifications may be contemplated within the spirit and scope of the following claims.

What is claimed is:

1. A DC/DC converter comprising buck stage means (11) that includes buck switch means (12), push-pull stage means (13) that includes push-pull switch means (14A, 14B), and control means (17) to control switching phases of said buck switch means and said push-pull switch means, characterized in that said converter further comprises autosynchronizing means (19) for producing synchronization pulses ($T_{SYNC}$) at a fixed frequency and for automatically and continuously adjusting turn-on phases of said buck switch means and of said push-pull switch means to an optimal value at each occurrence of a synchronization pulse, said optimal value corresponding substantially to a phase shift of about 180 degrees between an output voltage of said buck stage means (11) and an output voltage of said push-pull stage means (13).

2. The DC/DC converter according to claim 1, characterized in that the autosynchronizing means (19) comprises synchronization pulse generator means to generate a synchronization pulse ($T_{SYNC}$) at a fixed frequency for controlling said control means (17) and for turning on a buck drive pulse ($T_{BUCK}$) for said buck switch means (12), pulse width measuring means responsive to said synchronization pulse ($T_{SYNC}$) to measure the width of each buck drive pulse ($T_{BUCK}$), and push-pull command generator means responsive to said pulse width measuring means to produce push-pull command signals for controlling the switching phases of said push-pull switch means (14A, 14B).

3. The DC/DC converter according to claim 1, characterized in that said control means (17) comprises regulation means for adjusting the width of said buck drive pulse ($T_{BUCK}$) in such a way that the buck output voltage reaches a predetermined value.

4. The DC/DC converter according to claim 3, characterized in that the regulation means comprises a voltage regulation loop, to compare the buck output voltage with a reference voltage, and a current regulation loop to control the buck output current in order to allow the buck output voltage to reach a reference value ($V_{REF}$).

5. A method of synchronizing switching phases in a DC/DC converter comprising switchable buck stage means (11) and switchable push-pull stage means (13), said switchable buck stage means being controlled by buck drive pulses ($T_{BUCK}$), and said switchable push-pull stage means being controlled by push-pull command signals (CLK-PPA, CLK-PPB), characterized in that said push-pull command signals are produced by the steps of: measuring the width of said buck drive pulses ($T_{BUCK}$); and centering a gap time ($T_{GAP}$) between turn-on phases of said push-pull command signals (CLK-PPA, CLK-PPB) with the buck drive pulses ($T_{BUCK}$).

6. The method according to claim 5, characterized in that the step of centering the gap time ($T_{GAP}$) between the turn-on phases of said push-pull command signals comprises the steps of sampling each buck drive pulse ($T_{BUCK}$) over two buck switching periods, and dividing by 2 the number of sampling clock periods to determine the turn-on phases of said push-pull command signals respectively.

7. The DC/DC converter according to claim 2, wherein the switching phase of said push-pull switch means is controlled such that a gap time between turn-on phases of said push-pull command signals is centered on said buck drive pulse.

* * * * *